April 12, 1927.
E. L. DELANY
1,624,479
MIXING VALVE
Filed March 6, 1925
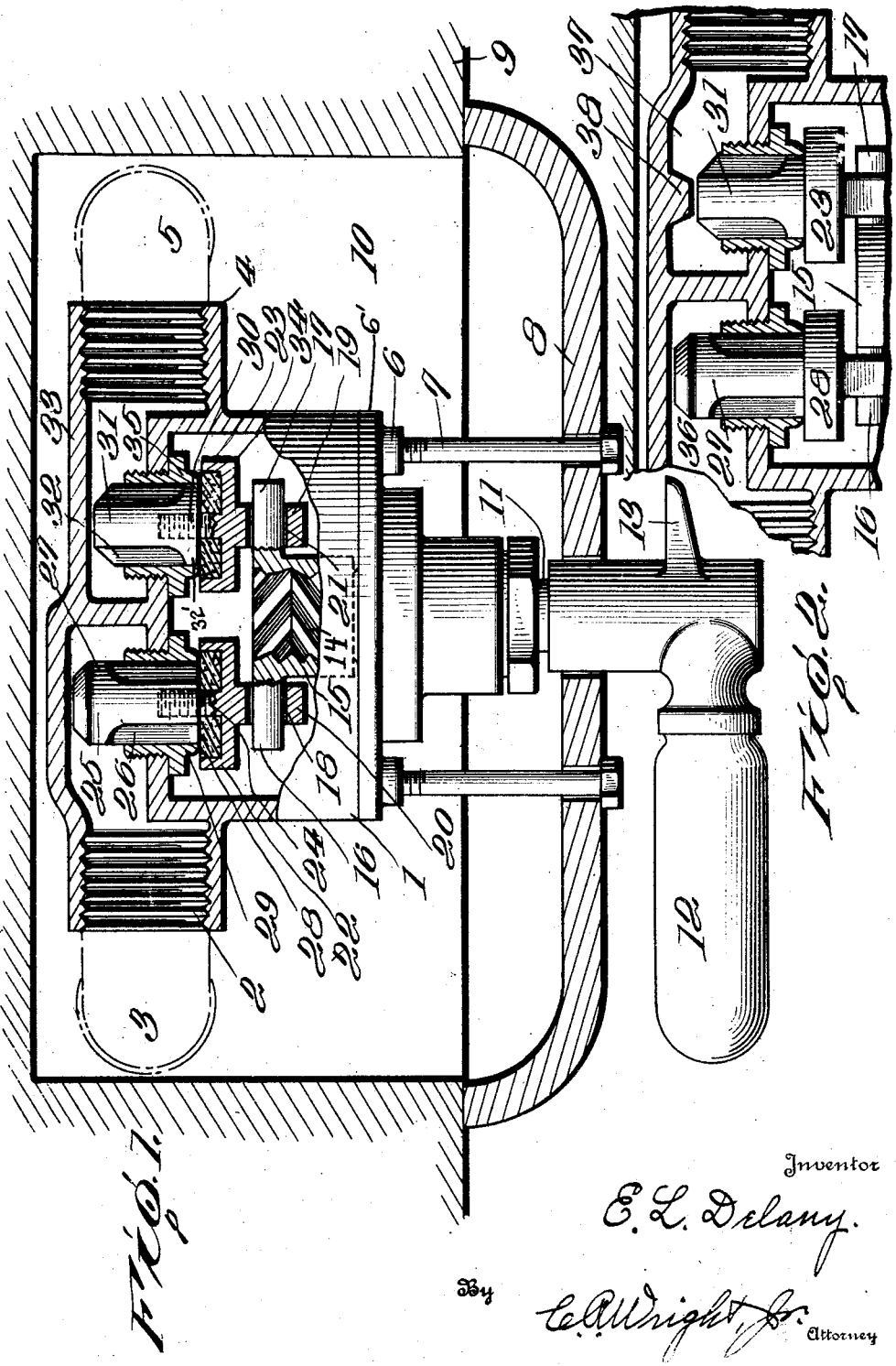
Inventor
E. L. Delany.
By C. A. Wright, Jr.
Attorney Patented Apr. 12, 1927.

1,624,479

UNITED STATES PATENT OFFICE.

EDWARD L. DELANY, OF BROOKLYN, NEW YORK.

MIXING VALVE.

Application filed March 6, 1925. Serial No. 13,644.

My invention relates to improvements in mixing valves.

The object of my invention is to provide a mixing valve particularly adapted for bath purposes whereby either cold, warm or hot water can be drawn from a single spigot, operated by a lever and having certain structure, whereby it is impossible to turn on scalding water upon the first part of the movement of the operating lever.

Another object of my invention is to provide a valve of this character adapted more particularly for shower baths in which the valves are arranged within a recess in the wall above the tub, and whereby it is impossible for the plumber to assemble the valves in the housing in such a manner that the cold water valve will be transposed opposite the hot water inlet, and thus positively prevent the liability of scalding by supplying hot water to the valve when the cold water is indicated by the valve operating lever on the dial.

A further object of my invention is to provide a trunnion connection between the operating means and the valves having a slip connection, whereby the valves are readily and removably connected to the operating means, and provision is made for slight variations in the valves so that they have a limited lateral movement in respect to the trunnions so that they will properly seat and at the same time will properly adjust themselves on the trunnions.

A still further object of my invention is to provide a valve of this character in which both the hot and cold water valves, the discharge pipe and the hot and cold water inlet pipes are so connected to the casing that a smaller casing can be employed, and also eliminating all screws and hand finishing, and at the same time reducing the cost of manufacture, and thus produce a cheap, simple and effective mixing valve having certain details of structure and combination of parts hereinafter more fully set forth.

In the accompanying drawings:—

Figure 1 is a horizontal sectional view of my improved mixing valve showing it in position in the recess of the wall, and showing the operating lever in full lines.

Figure 2 is a sectional view of the inlet and outlet passages showing a modified form of means for preventing the hot and cold water valves from being transposed.

Referring now to the drawings, 1 represents the housing, which as shown, is of a cylindrical form having at its upper end the discharge opening, all of which is well understood and can be readily understood from the disclosure of my application filed the 26th day of February 1925, Serial No. 11,821, on which the present invention is an improvement.

The cylindrical body portion 1 is provided with a screw threaded opening 2 into which is screwed the cold water supply pipe 3. The opposite side of the housing is provided with a screw threaded opening 4, into which is screwed the hot water supply pipe 5. The housing 1 is covered by a plate 6', having screw threaded nipples 6, into which are screwed the screw bolts 7, which clamp the cover and dial plate 8 to the outer face of the wall 9, in which the recess 10 is arranged. This specific construction is fully shown in the application hereinbefore mentioned and needs no further description. The valve operating shaft 11 is provided with an operating lever 12, carrying a pointer 13, to indicate the proper position of the valves on the dial plate 8. The inner end of the shaft 11 is screw threaded as indicated at 14, and upon which is screwed the cylindrical member 15, carrying at its inner end the oppositely disposed trunnions 16 and 17, which can be either cylindrical or angular, and are adapted to pass through the openings 18 and 19 in the extensions 20 and 21 of the cold and hot water valves 22 and 23. Thus, it will be seen that by the rotation of the valve shaft 11, the sleeve 15 is caused to move longitudinally thereon, thus, carrying with it the cold and hot water valves 22 and 23, through the medium of the trunnions 16 and 17. The trunnions 16 and 17 are slightly smaller than the openings 18 and 19 whereby provision is made for slight variations in the positions of the valves so that they have a lateral movement on the trunnions and will properly seat themselves and are also free to move inwardly or outwardly on the trunnions so that they may be brought into alinement with the valve seats.

The cold water valve 22 is provided with a screw threaded extension 24 upon which is screwed the plug 25. This plug 5 has the passages 26 arranged around its periphery and has a solid portion 27 at its outer end, all of which will be hereinafter more fully described. The valve as shown, has a gasket 28 adapted to form a tight joint with the seat 29.

The hot water valve 23 has a screw threaded extension 30, upon which is screwed the plug 31, having in its outer periphery the passages 32, and at its inner end the solid portion 32'. This plug 31, as shown, is of a length considerably less than that of the plug 25, and the wall of the hot water passage is contracted inwardly as indicated at 33, whereby when the valve 23 is closed the outer end of the plug is close to the contracted portion 33. The valve 23 is provided with a washer 34 adapted to form a tight joint with the seat 35, and whereby the flow of water is cut off. In operation, it will be seen that upon the turning of the shaft 11, the sleeve 15 will be moved outwardly, carrying with it both the hot and cold water valves. A slight movement of the cold water valve brings the inner ends of passages 26 into communication with the interior of the casing and allows cold water to pass thereto, and out through the outlet. A continued movement of the lever brings the solid portion 32' of the hot water valve, into a position such that the inner end of the passage 32 communicates with the interior of the casing 1, and both hot and cold water will be supplied to the casing, and passed therefrom properly mixed. A continued movement of the valve operating shaft gradually brings the solid portion 27 of the cold water valve to a position where the cold water is entirely cut off, and at the same time gradually moves the hot water valve so that the passages 32 are in full communication with the casing, and nothing but hot water is passing from the valves.

From the foregoing description it will be seen that the contracted wall 33 of the hot water inlet prevents the cold water valve 22 from being placed on the hot water seat to form an operative structure. If the valves are transposed the cold water valve could not be moved into position so that the washer 28 would rest against the valve seat 35, and therefore the plumber would know that the valves had been wrongly assembled. Therefore, it is impossible to transpose the valves so that in the operation of the valve hot water would be first supplied to the outlet, instead of cold water.

In the modification shown in Figure 2 of the drawings, the cold water inlet 36 is constructed exactly like the hot water inlet 37, except that the hot water inlet is provided with a projection 38 positioned so that the longer or cold water valve can not be placed in the hot water passage.

Having thus fully described my invention what I claim is:—

1. A mixing valve comprising a housing having hot and cold water inlets, and an outlet, valves controlling the communication between the hot and cold water inlets and the outlet, a removable trunnion connection between the valves and the operating means, and the hot water inlet so constructed that the cold water valve can not be placed therein and seat itself.

2. A mixing valve comprising a housing having hot and cold inlets, and an outlet, valves controlling the communication between the hot and cold water inlets and the outlet, a movable member having two oppositely arranged lateral trunnions adapted to pass through corresponding openings in the valves, and the hot water inlet so constructed that the cold water valve can not be placed therein and seat itself.

3. A mixing valve comprising a housing having hot and cold water inlets communicating with an outlet, valves of different lengths and construction controlling the communication between the hot and cold water inlets and the outlet, a movable member carried by the housing intermediate the valves, outwardly extending lateral trunnions carried by the movable member, and adapted to pass through openings in the valves, and the hot water inlet constructed so that the cold water valve can not be inserted in the hot water inlet and seat itself.

4. A mixing valve comprising a housing having hot and cold water inlets communicating with the housing, valves of equal capacity controlling the communication between the hot and cold water inlets and the housing, and of different lengths, and one inlet so constructed that the valve of the other inlet can not be placed therein, and means for simultaneously moving said valves.

5. A mixing valve comprising a housing having hot and cold water inlets and an outlet, valves of equal capacity controlling the inlets and of different lengths, one inlet so constructed that the valve of the other inlet can not be placed therein, and an operating means for simultaneously operating the valves.

6. A mixing valve comprising a housing having hot and cold water inlets communicating with the housing, an outlet, valves of equal capacity controlling the communication between the hot and cold water inlets and the housing, and of different lengths, the hot water inlet of a less depth than the cold water inlet, so that the cold water valve can not be placed in the hot water inlet and seat itself, and an operating means for simultaneously operating the valves.

In testimony whereof, I have signed this specification.

EDWARD L. DELANY.